United States Patent
Seol et al.

(10) Patent No.: US 10,644,762 B2
(45) Date of Patent: May 5, 2020

(54) APPARATUS HAVING MULTIPLE RF CHAINS COUPLED TO MULTIPLE ANTENNAS AND OPERATING METHOD THEREOF IN WIRELESS COMMUNICATION SYSTEM

(71) Applicant: Samsung Electronics Co., Ltd., Gyeonggi-do (KR)

(72) Inventors: Daeyoung Seol, Gyeonggi-do (KR); Sukkyun Hur, Gyeonggi-do (KR); Jaeeun Na, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 16/164,210

(22) Filed: Oct. 18, 2018

(65) Prior Publication Data
US 2019/0123787 A1 Apr. 25, 2019

(30) Foreign Application Priority Data
Oct. 19, 2017 (KR) .................. 10-2017-0135722

(51) Int. Cl.
*H04B 7/0413* (2017.01)
*H04L 5/14* (2006.01)
(Continued)

(52) U.S. Cl.
CPC ......... *H04B 7/0413* (2013.01); *H04B 7/0602* (2013.01); *H04B 7/0802* (2013.01); *H04L 5/14* (2013.01); *H04W 24/10* (2013.01)

(58) Field of Classification Search
CPC .. H04B 7/0857; H04B 7/0617; H04B 7/0602; H04B 7/0413; H04B 7/0802; H04W 24/02; H04W 24/10; H04L 5/14
See application file for complete search history.

(56) References Cited

U.S. PATENT DOCUMENTS 10,123,248 B1\* 11/2018 Marupaduga ....... H04W 28/085
2005/0096058 A1\* 5/2005 Warner ................ H04B 7/0608
455/446

(Continued)

FOREIGN PATENT DOCUMENTS

| EP | 2 742 745 | 6/2014 |
|---|---|---|
| KR | 1020180093498 | 8/2018 |
| WO | WO 02/054623 | 7/2002 |

OTHER PUBLICATIONS

European Search Report dated Mar. 28, 2019 issued in counterpart application No. 18201311.0-1220, 8 pages.

Primary Examiner — Sung S Ahn
(74) Attorney, Agent, or Firm — The Farrell Law Firm, P.C.

(57) ABSTRACT

The present disclosure relates to a 5G or pre-5G communication system for supporting a data rate higher than that of 4G communication systems such as LTE systems. A method for controlling a device having a plurality of radio frequency (RF) chains coupled to a plurality of antennas in a wireless communication system according to an embodiment of the present invention includes comparing a measured temperature of the device with a temperature threshold, controlling status of at least one of the RF chains according to a comparison result between the measured temperature and the temperature threshold, and transmitting a radio signal using at least one of the antennas that is connected to the at least one RF chain.

20 Claims, 20 Drawing Sheets

(51) Int. Cl.
*H04W 24/10* (2009.01)
*H04B 7/06* (2006.01)
*H04B 7/08* (2006.01)

(56) References Cited

U.S. PATENT DOCUMENTS

2013/0039173 A1 2/2013 Ehsan et al.
2014/0199952 A1 7/2014 Sandhu et al.

* cited by examiner

FIG. 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

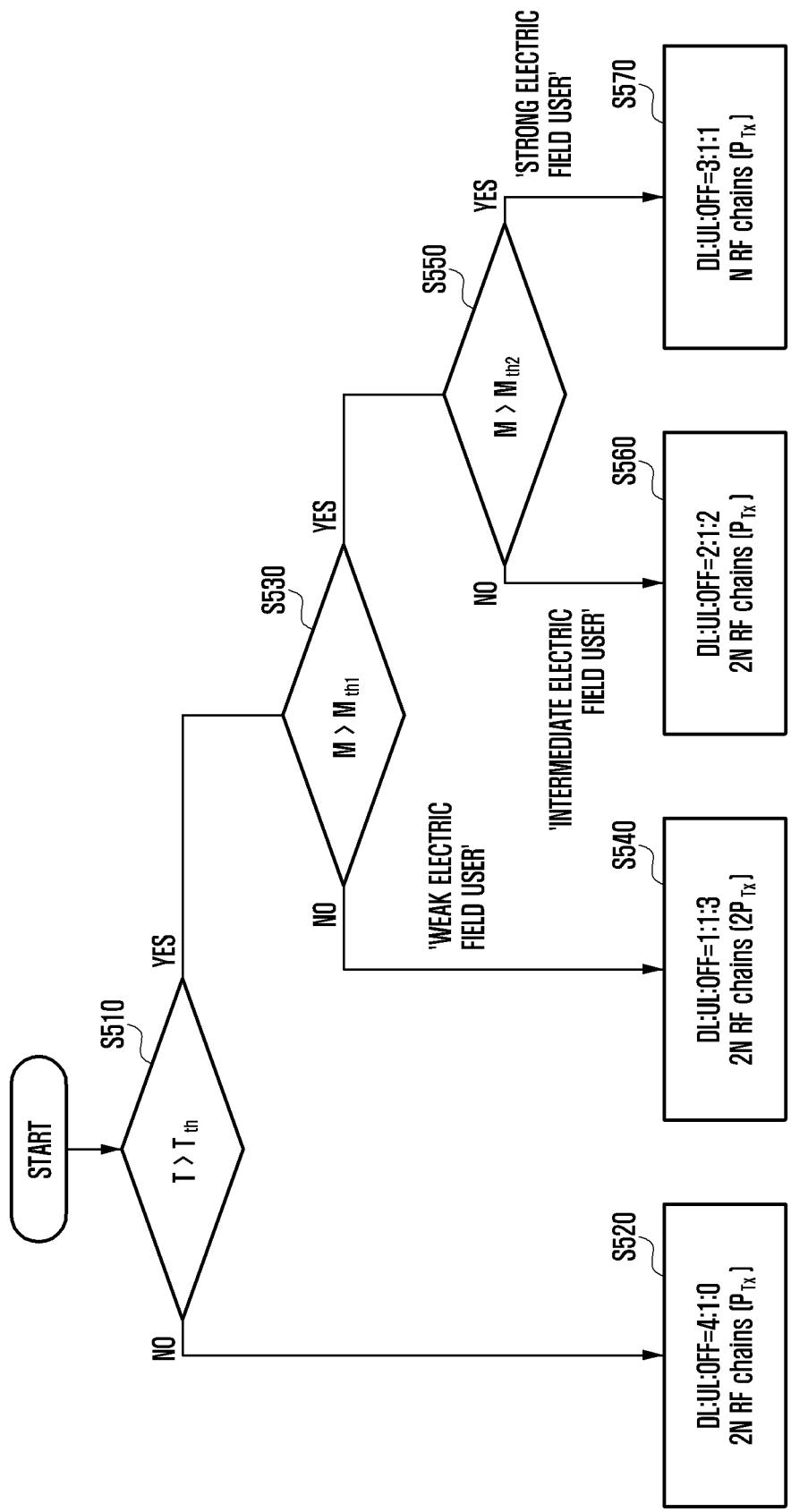

APPARATUS HAVING MULTIPLE RF CHAINS COUPLED TO MULTIPLE ANTENNAS AND OPERATING METHOD THEREOF IN WIRELESS COMMUNICATION SYSTEM

CROSS-REFERENCE TO RELATED APPLICATION(S)

This application is based on and claims priority under 35 U.S.C. § 119(a) to Korean Patent Application Serial No. 10-2017-0135722, filed on Oct. 19, 2017, in the Korean Intellectual Property Office, the entire disclosure of which is incorporated herein by reference.

BACKGROUND

1. Field

The present disclosure relates generally to a method for controlling a plurality of radio frequency (RF) chains with which a device is equipped to mitigate performance degradation of the device in a high temperature environment.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway regarding various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) and sliding window superposition coding (SWSC) as advanced coding modulation (ACM), filter bank multi-carrier (FBMC), non-orthogonal multiple access (NOMA), and sparse code multiple access (SCMA).

In order to meet the broad bandwidth requirements for a 5G communication system, an mmWave technology is being considered. Although the short wavelength of mmWave frequency is advantageous to reduce the size of each antenna, it also requires a heat radiating fan and/or pin to cool down the RF chains coupled to the antennas especially when all of the RF chains are active, which makes it difficult to design a product compact in size. Typically, the cooling capacity of the radiating fan or pin of a base station is determined on the assumption of the maximum-required performance limit (maximum heat radiating capacity) and, in this respect, the size of the radiating fan or pin selected to meet the requirements for the worst temperature condition is likely to be an excessively-designed heat radiating structure on the operating condition in a normal temperature range.

SUMMARY

The present disclosure has been made to address at least the disadvantages described above and to provide at least the advantages described below.

Accordingly, an aspect of the present disclosure provides a method and apparatus for reducing a size of a device equipped with multiple RF chains and mitigating performance degradation of the device in a high temperature condition by alleviating the heat radiation requirements in design.

In accordance with an aspect of the present disclosure, a method for controlling a device having a plurality of radio frequency (RF) chains coupled to a plurality of antennas in a wireless communication system is provided. The method includes comparing a measured temperature of the device with a temperature threshold, controlling a status of at least one of the RF chains according to a comparison result between the measured temperature and the temperature threshold, and transmitting a radio signal using at least one of the antennas that is connected to the at least one RF chain.

In accordance with an aspect of the present disclosure, a device is provided. The device is equipped with a plurality of radio frequency chains coupled to a plurality of antennas. The device includes a transceiver configured to transmit and receive a signal and a controller configured to control to compare a measured temperature of the device with a temperature threshold, control a status of at least one of the RF chains according to a comparison result between the measured temperature and the temperature threshold, and transmit a radio signal using at least one of the antennas that is connected to the at least one RF chain.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 2 is a diagram of uplink-downlink configurations indicating uplink and downlink subframes in an LTE system operating in time division duplex (TDD) mode;

FIG. 5 is a flowchart of a procedure for controlling status of RF chains included in a device, according to an embodiment;

DETAILED DESCRIPTION

Figure 1:
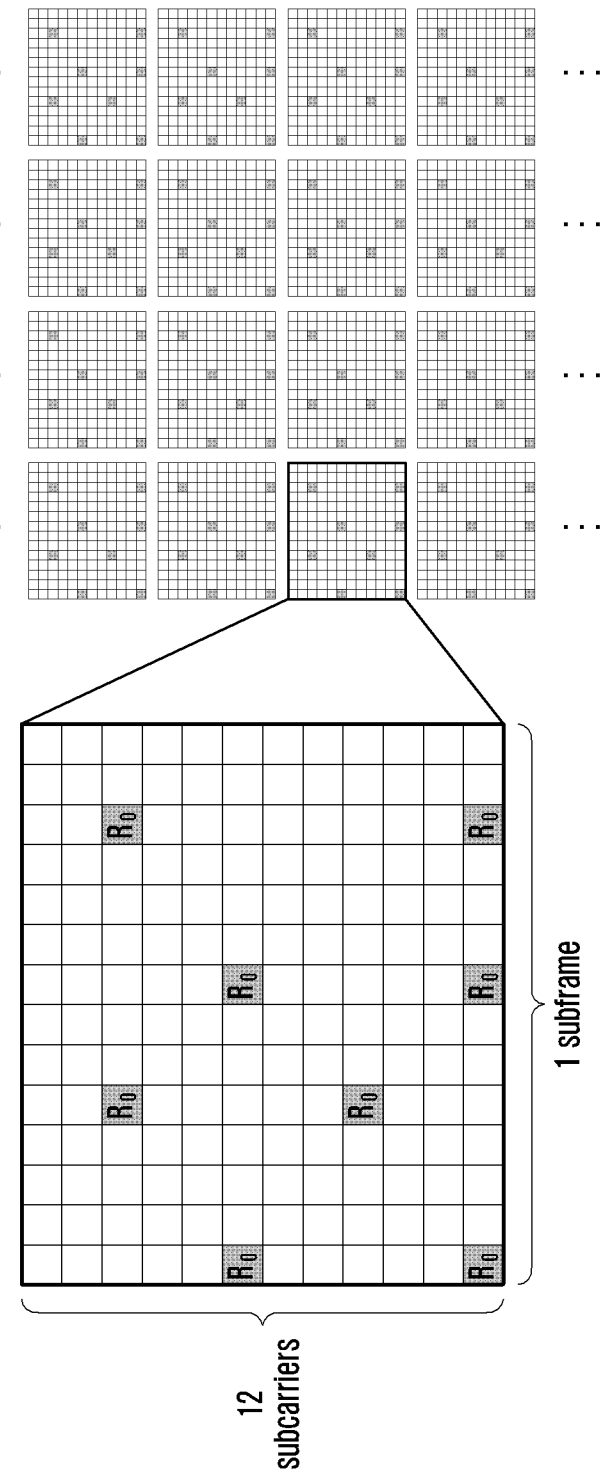
FIG. 1 is a diagram of resources for transmitting a cell-specific reference signal (CRS) in a wireless communication system.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

In order to meet the increasing demand for wireless data traffic since the commercialization of 4G communication systems, the development focus is on the 5G or pre-5G communication system. In order to accomplish higher data rates and increase the propagation distance by mitigating propagation loss in the 5G communication system, technologies using multiple antennas massive MIMO and analog beamforming are considered. In order to use the multiple antennas, there is also need of multiple RF chains (hereinafter, interchangeably referred to as multi-chain) coupled to the respective antennas, and activation of the multiple RF chains entails increase of power consumption and heat generation inside the device (e.g., base station).

The RF chains may be transmit RF chains or receive RF chains. The transceiver (Tx) RF chains may include at least one of a digital-to-analog converter (DAC), a in/quadrature phase (I/Q) modulator, an intermediate frequency (IF) amplifier, an IF mixer, an IF filter, an RF mixer, an RF filter, and an RF amplifier. The receive RF chains may include at least one of an RF low noise amplifier (LNA), an RF filter, an RF mixer, an IF filter, an IF mixer, an IF LNA, an I/Q demodulator, and an analog-to-digital converter (ADC).

Although the description is directed to the transmit RF chains with which the method and apparatus of the present disclosure is capable of achieving relatively high power saving effect, the method and apparatus of the present disclosure is also applicable to the receive RF chains.

The present disclosure provides a method for controlling the internal power consumption and heat generation of the device including the multiple RF chains in a stepwise manner by adjusting a multi-chain use time, a number of active RF chains, and per-RF chain transmit powers.

FIG. 1 is a diagram of resources for transmitting a CRS in a wireless communication system.

Referring to FIG. 1, a base station may transmit the CRS at the resource locations marked with Ro in predetermined downlink subframes in an LTE system. Since the base station has to transmit CRS using the configured resources even when there is no downlink data to transmit, it is impossible to turn off all of the multiple RF chains of the base station.

FIG. 2 is a diagram of uplink-downlink configurations indicating uplink and downlink subframes in an LTE system operating in TDD mode.

Referring to FIG. 2, in the LTE-TDD system, a radio frame is configured with a pattern of uplink and downlink subframe allocations according to one of several uplink-downlink configurations, and the base station broadcasts the uplink-downlink configuration such that both the terminal and the base station are aware that each subframe is designated for downlink transmission or uplink transmission.

If a downlink (DL)/uplink (UL) ratio is determined, the base station has to operate according to the determined DL/UL ratio regardless of ambient environmental factors (such as temperature and heat generation), the UL/DL ratio determining numbers of component carriers and RF chains.

In order change the UL-DL configuration to adapt to the ambient temperature, however, the base station has to notify user terminals of the change of the broadcast information including the UL-DL configuration information and then the user terminals have to receive the changed UL-DL configuration information, resulting in control signaling overhead.

In order to meet the broad bandwidth requirements for a 5G communication system, an mmWave technology is being considered. Although the short wavelength of mmWave frequency is advantageous to reduce the size of each antenna, it also requires a heat radiating fan and/or pin to cool down the RF chains coupled to the antennas especially when all of the RF chains are active, which makes it difficult to design a product compact in size. Typically, the cooling capacity of the radiating fan or pin of a base station is determined on the assumption of the maximum-required performance limit (maximum heat radiating capacity) and, in this respect, the size of the radiating fan or pin selected to meet the requirements for the worst temperature condition is likely to be an excessively-designed heat radiating structure on the operating condition in a normal temperature range.

The present disclosure provides a method for controlling power consumption and heat generation of a device in a stepwise manner by adjusting a use time of multiple RF chain, a number of active RF chains, and per-RF chain transmit powers. The number of active RF chains and DL/UL ratio may be adjusted in adaptation to the ambient environmental factors (temperature, heat generation, etc.). The present disclosure makes it possible to reduce the body size of a base station by optimizing the heat radiating structure to achieve its best performance under a normal temperature condition rather than the worst high temperature condition. This may limit the performance of the product at the peak operating temperature but makes it possible to reduce the size of the product and mitigate the necessity of using a radiating fan generating noise and/or a radiating pin spoiling the product appearance in comparison with the product designed to guarantee the maximum performance at the peak operating temperature.

Figure 3:
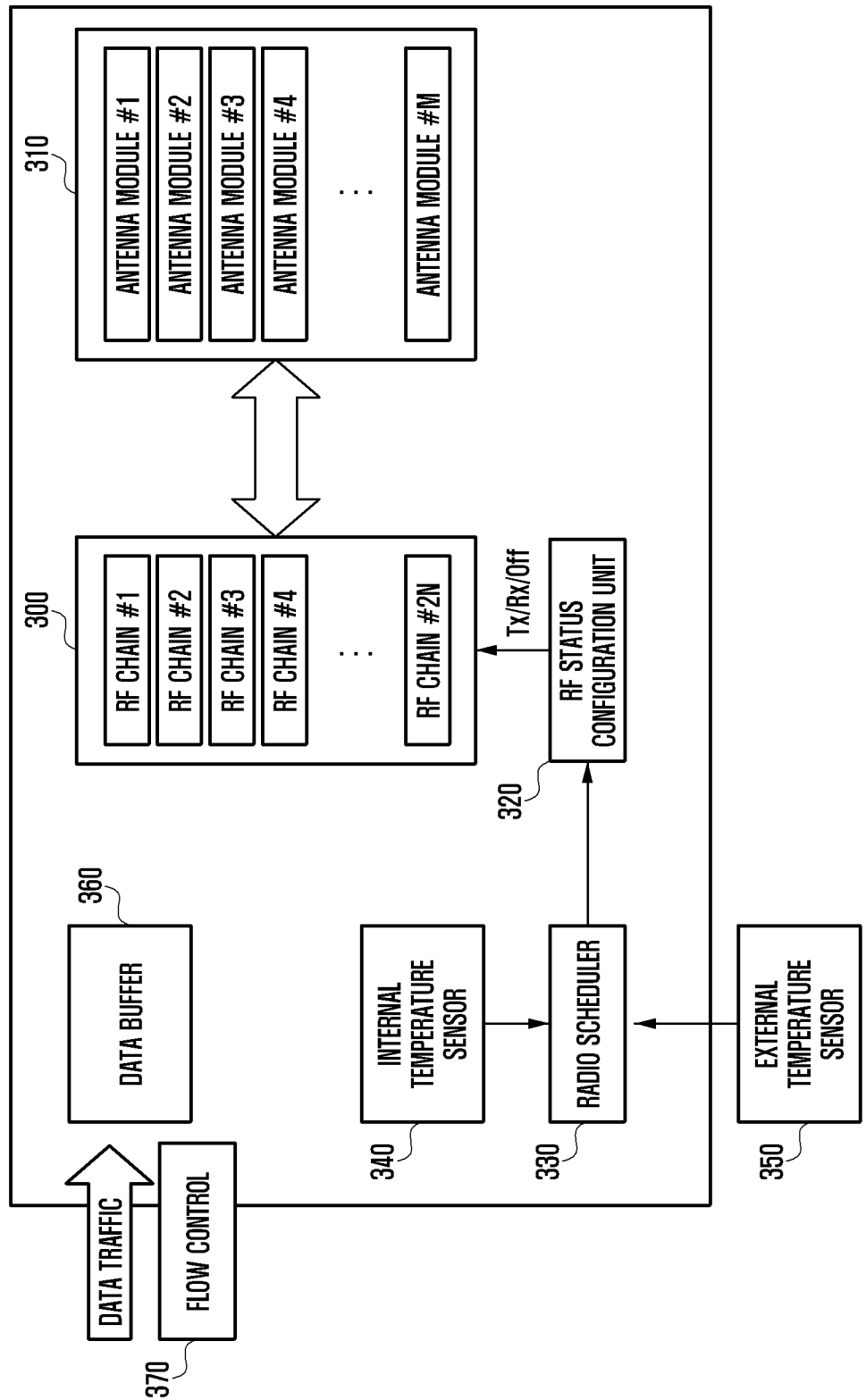
FIG. 3 is a diagram of a device including multiple RF chains according to an embodiment.

FIG. 3 is a diagram of a device including multiple RF chains, according to an embodiment.

Referring to FIG. 3, the device may include at least one of a plurality of RF chains 300, a plurality of antenna modules 310, an RF status configuration unit 320, a radio scheduler 330, an internal temperature sensor 340, an external temperature sensor 350, and a data buffer 360. The device may be a base station configured for use in a TDD system supporting the TDD UL-DL configurations of FIG. 2. The device may be a base station configured for use in a frequency division duplex (FDD) system.

The RF chains 300 may include a first RF chain (RF chain #1), a second RF chain (RF chain #2), . . . , a $2N^{th}$ RF chain (RF chain #2N). The antenna modules 310 may include a first antenna module (antenna module #1), a second antenna module (antenna module #2), . . . , an $M^{th}$ antenna module (antenna module # M). N and M may be values greater than or equal to 2.

Each of the RF chains 300 may be coupled to at least one of the antenna modules 310. From the viewpoint of power, the RF chains 300 may amplify a signal and send the amplified signal to the antenna modules 310 coupled to the respective RF chains 300 or amplify a signal received from the antenna modules 310 and send the amplified signal to an element in the device.

The RF status configuration unit 320 may configure per-RF chain power consumption statuses under the control (or command) of the radio scheduler 330.

The radio scheduler 330 may perform uplink/downlink resource allocation. The radio scheduler 330 may control the statuses (e.g., transmit power, use time, being used or not, and bandwidth) of the RF chains 300 by the unit of minimum data transmission time or shorter than the minimum data transmission time.

The radio scheduler 330 may control the statuses (e.g., transmit power, use time, being used or not, and bandwidth) of the RF chains 300 based on at least one of internal temperature (or external temperature) of the device and measurement information of the user terminal.

The radio scheduler 330 may determine the temperature of the device using at least one of the internal temperature measured by the internal temperature sensor 340 and the external temperature measured by the external temperature sensor 350. The radio scheduler 330 may compare the measured temperature with a predetermined temperature threshold to determine whether to control the operations of the RF channels and, if determined to control, a control mode.

The radio scheduler 330 may adjust the use time/number/bandwidth of each RF chain in a stepwise manner in consideration of the power consumption of the internal modules of the electronic device according to a plurality of temperature thresholds. The radio scheduler may change the control order of the use time/number/bandwidth of the individual RF chains in consideration of the power consumptions of the internal modules.

If there is a user terminal to receive downlink data, the scheduler may schedule downlink transmission according to the RF chain control mode determined based on the measurement information of the user terminal.

The radio scheduler may adjust the data amount from a high layer, as denoted by reference number 370, by providing the high layer (e.g., radio link control (RLC) layer) with the information on the measured temperature of the device and the per-user data rate when applying the measured temperature using a total given time. The higher layer may control data amount in a DL data buffer of the base station.

The measured temperature may be determined at at least one of the internal temperature measured by the internal temperature sensor 340 and the external temperature measured by the external temperature sensor 350. The per-user data rate may refer to the data rate when using the total given time. The higher layer may provide the device with the data, which is adjusted in an amount according to the measured temperature and data rate.

While the device receives data traffic, the data buffer 360 may store the received data traffic temporarily.

It may be considered to adjust or turn on/off the power of the RF chains for the subframes carrying user data only without any cell-specific common control channel (e.g., LTE CRS) or notify the users with whether to transmit the cell-specific common control channel transmission in advance via a separate radio resource control (RRC) signaling message or downlink control information—to extend the target subframe regions for controlling the RF chains.

Figure 4A:
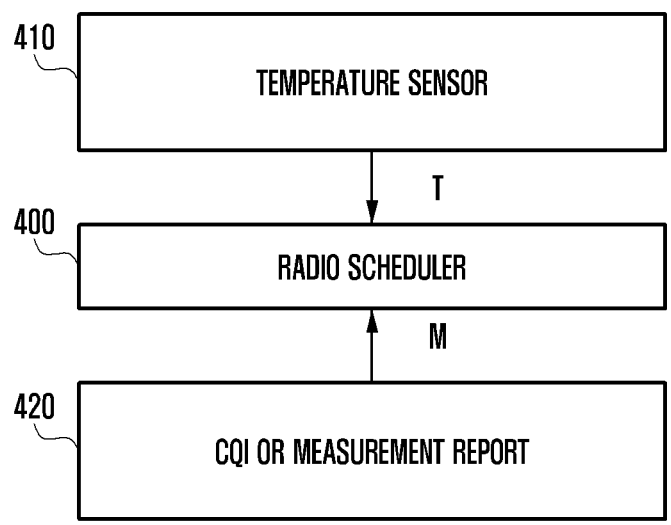
FIG. 4A is a diagram of an operation of a radio scheduler, according to an embodiment.

FIG. 4A is a diagram of an operation of a radio scheduler, according to an embodiment.

Referring to FIG. 4, the radio scheduler 400 receives information on the temperature (T) measured by a temperature sensor 410 implemented inside or outside the device and measurement information M (e.g., channel quality indicator (CQI) and measurement report) from a user terminal. The temperature sensor 410 may measure the temperature inside or outside the device and notify the radio scheduler 400 of the measured temperature.

The radio scheduler 400 may compare the measured temperature with a predetermined temperature threshold and the measurement value corresponding to the measurement information with at least one predetermined threshold value and determine whether to control the multiple RF chains and, if determined to control, a control level on the basis of the comparison results.

If there is any user terminal which receives downlink data in a situation where the radio scheduler 400 further restricts the power consumption of the device because the measured temperature is greater than the temperature threshold, the radio scheduler may perform scheduling in a RF chain-specific control manner to maximize the data rate for the user terminal under the same power consumption restriction condition by referencing the measurement information from the user terminal.

The radio scheduler 400 may provide the RF status configuration unit with the information on whether to control the multiple RF chains and, if necessary, the control level in order for the RF status configuration unit to control the multiple RF chains.

Figure 4B:
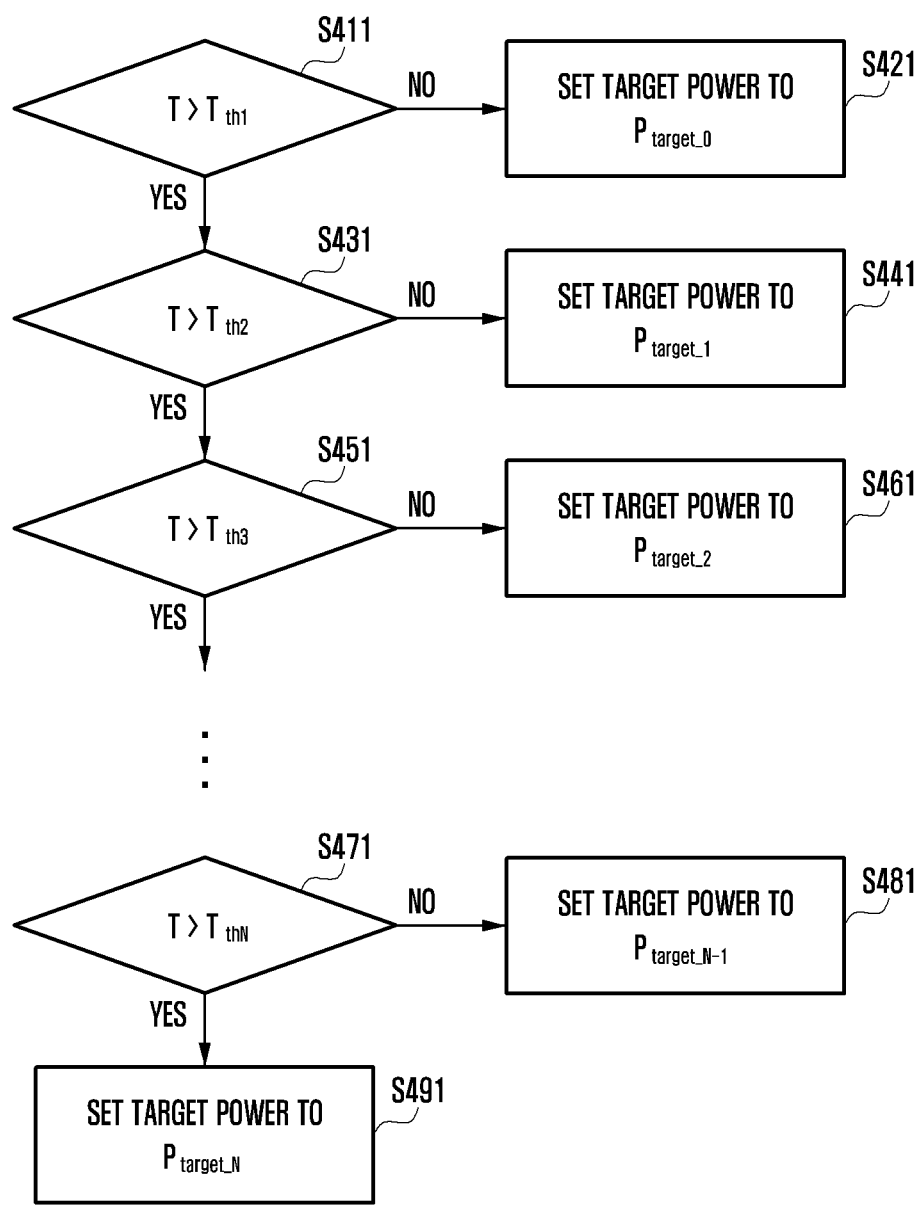
FIG. 4B is a flowchart of a procedure for a radio scheduler to adjust power consumption based on a result of comparison between a measured temperature and a temperature threshold, according to an embodiment.

FIG. 4B is a flowchart of a procedure for a radio scheduler to adjust power consumption based on a result of comparison between a measured temperature and a temperature threshold, according to an embodiment.

Referring to FIG. 4B, the radio scheduler configures at least one of temperature thresholds (Tth1, Tth2, Tth3, . . . , TthN) and compares the measured temperature (T) with at least one of the temperature thresholds (Tth1, Tth2, Tth3, . . . , TthN) to adjust the power consumption of the device equipped with the multiple RF chains based on the comparison result. The per-temperature threshold power consumption restriction levels may be set in consideration of the power consumption amounts and heat radiation capacities of the internal component modules of the device.

If it is determined at step S411 that the measured temperature (T) is less than or equal to the first temperature threshold (Tth1), the radio scheduler may set the target power of the device with the multiple RF chains to a first value (Ptarget_0) at step S421. The radio scheduler may determine whether to control the RF chain and, if so, the control level according to the first value (Ptarget_0).

If it is determined at step S431 that the measure temperature (T) is greater than the first temperature threshold (Tth1) and less than or equal to the second temperature threshold (Tth2), the radio scheduler may set the target power of the device with the multiple RF chains to a second value (Ptarget_1) at step S441. The radio scheduler may determine whether to control the RF chain and, if so, the control level according to the second value (Ptarget_1).

Likewise, the radio scheduler may compare the measured temperature (T) with the third temperature threshold (Tth3) and the $N^{th}$ temperature threshold (TthN) at steps S451; and S471 respectively and set the target power of the device with the multiple RF chains to a corresponding value (Ptarget_2, Ptarget_N−1, or Ptarget_N) at step S461, S481, or S491 according to the comparison result.

Figure 4C:
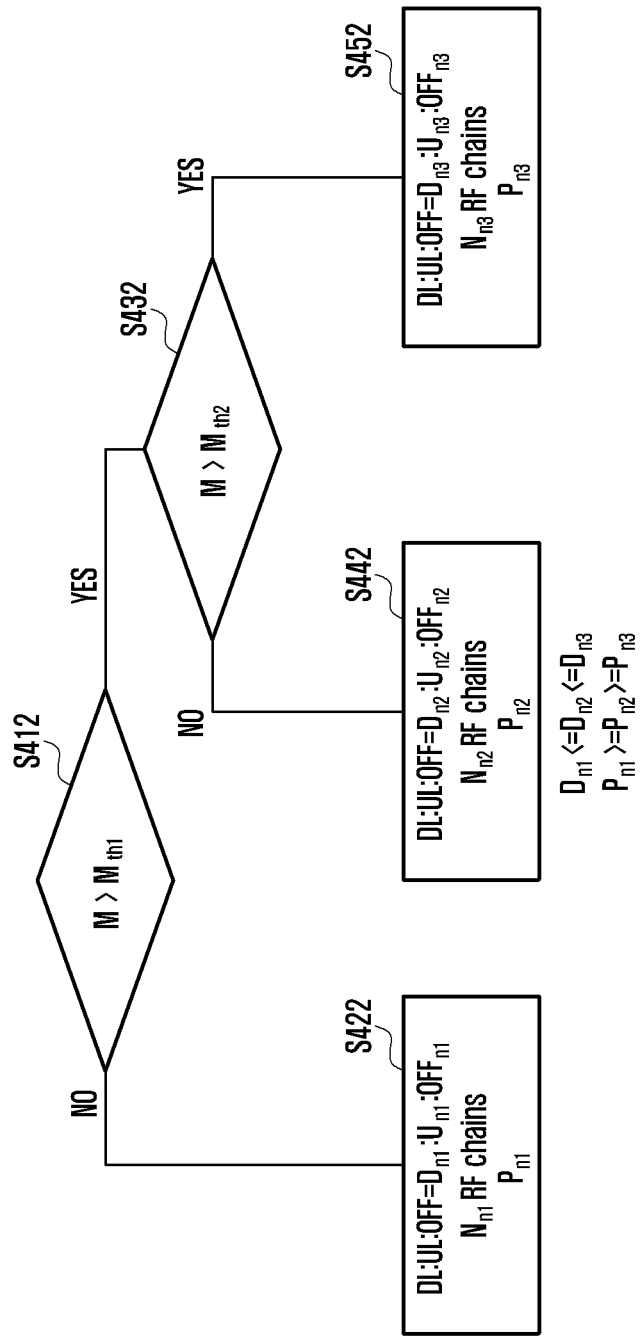
FIG. 4C is a flowchart of a procedure for a radio scheduler to control statuses of RF chains based on measurement information of a user terminal, according to an embodiment.

FIG. 4C is a flowchart of a procedure for a radio scheduler to control statuses of RF chains based on an measurement information of a user terminal, according to an embodiment.

Referring to FIG. 4C, if it is determined at step S412 that the measurement value (M) corresponding to the measurement information of the user terminal is less than or equal to a first threshold value ($M_{th1}$), the radio scheduler may regard the terminal corresponding to the measurement value (M) as a 'weak measurement value user' and set a DL/UL/OFF period ratio for the multiple RF chains to a predetermined value (e.g., '$D_{n1}$:$U_{n1}$:$OFF_{n1}$') at step S422 to control the use time of the multiple RF chains. At step S422, the radio scheduler may also set the number of active RF chains to '$N_{n1}$' and the transmit power of the RF chains to '$P_{n1}$'.

If it is determined at step S412 that the measurement value (M) is greater than the first threshold value ($M_{th1}$), the radio scheduler may compare the measurement value (M) corresponding to the measurement information with a predetermined second threshold value ($M_{th2}$) at step S432.

If it is determined at step S432 that the measurement value (M) is less than or equal to the second threshold value ($M_{th2}$), the radio scheduler regards the terminal corresponding to the measurement value (M) as an 'intermediate measurement user' and set the DL/UL/OFF period ratio for the multiple RF chains to a predetermined value (e.g., '$D_{n2}$:$U_{n2}$:$OFF_{n2}$') at step S442 to control the use time of the multiple RF chains. At step S442, the radio scheduler may also set the number of active RF chains to '$N_{n2}$' and the transmit power of the RF chains to '$P_{n2}$'.

If it is determined at step S432 that the measurement value (M) is greater than the second threshold value ($M_{th2}$), the radio scheduler regards the terminal corresponding to the measurement value (M) as a 'strong measurement value user' and set the DL/UL/OFF period ratio for the multiple RF chains to a predetermined value (e.g., '$D_{n3}$:$U_{n3}$:$OFF_{n3}$') at step S452 to control the use time of the multiple RF chains. At step S452, the radio scheduler may also set the number of active RF chain to '$N_{n3}$' and the transmit power of the RF chains to '$P_{n3}$'.

The DL transmit period ratio may satisfy an inequity of "$D_{n1} \leq D_{n2} \leq D_{n3}$", and the transmit power of the multiple RF chains may satisfy an inequity of "$P_{n3} \leq P_{n2} \leq P_{n1}$".

The radio scheduler may apply the same transit power to the multiple RF chains and adjust at least one of the use time of the multiple RF chains and the number of active RF chains to control the status of the multiple RF chains.

The radio scheduler may apply the same transmit time duration to the multiple RF chains ($D_{n1}=D_{n2}=D_{n3}$) and adjust at least one of the transmit power of the multiple RF chains and the number of active RF chains to control the status of the multiple RF chains.

Although the status of the multiple RF chains are adjusted in a specific manner as described in FIG. 4C, the present disclosure is not limited thereto and may encompass other examples in which the status of the multiple RF chains are adjusted in various manners depending on the design of the device including the multiple RF chains.

FIG. 5 is a flowchart of a procedure for controlling status of RF chains included in a device, according to an embodiment.

Referring to FIG. 5, the radio scheduler may compare, at step S510, the temperature (T) measured by a temperature sensor installed inside or outside a device with a predetermined temperature threshold ($T_{th}$).

The radio scheduler compares the measured temperature (T) of the device with the temperature threshold ($T_{th}$) to configure to control the multiple RF chains differently under a normal temperature condition and a high temperature condition. The radio scheduler may configure the device to achieve the best performance under the normal temperature condition and limit the performance of the device under the high temperature condition. If the internal or external temperature (T) of the device becomes greater than the temperature threshold ($T_{th}$), the radio scheduler may limit the use time, number, transmit power, and bandwidth of the multiple active RF chains.

The radio scheduler may limit the use time, number, transmit power, and bandwidth of the multiple active RF chains in consideration of the power consumption amounts of the component modules of the device. The radio scheduler may determine to limit the use time, number, transmit power, and bandwidth of the multiple active RF chains in a descending order of power saving effect in consideration of the power consumption amounts of the component modules of the device.

If it is determined at step S510 that the measured temperature (T) is less than or equal to the temperature threshold ($T_{th}$), the radio scheduler may set a DL/UL/OFF period ratio of the multiple RF chains to '4:1:0' at step S520 to control the use time of the multiple RF chains. At step S520, the radio scheduler may set the number of active RF chains to '2N' and the transmit power of the active RF chains to '$P_{TX}$'.

If it is determined at step S510 that the measured temperature (T) is greater than the temperature threshold ($T_{th}$), the radio scheduler may compare a measurement value (M) of the measurement information with a predetermined first threshold value ($M_{th1}$) at step S530.

The radio scheduler may determine a limitation level of the multiple RF chains according to the measurement information of the user terminal that has received a radio signal transmitted by the device.

The radio scheduler may control the device to transmit the radio signal to a 'strong measurement value user' with part of the multiple RF chains during a transmit time period equal to or longer than that for an 'intermediate measurement value user'. The radio scheduler may control the device to transmit the radio signal to an 'intermediate measurement value user' during a transmit time period shorter than that configured for use under the normal operation temperature condition. The radio scheduler may control the device to transmit the radio signal to a 'weak measurement value user' at a high transmit power during a transmit time period equal to or shorter than that configured for the 'intermediate measurement value user'.

If it is determined at step S530 that the measurement value (M) is less than or equal to the first threshold value ($M_{th1}$), the radio scheduler may regards the terminal corresponding to the measurement value (M) as a 'weak measurement value user' and set the DL/UL/OFF period ratio to a value (e.g., '1:1:3') to control the use time of the multiple RF chains. At step S540, the radio scheduler may set the number of active RF chains to '2N' and the transmit power of the active RF chains to '$2P_{TX}$'.

The radio scheduler may decrease the DL transmit period for the 'weak measurement value user' to reduce the use time of the active RF chains and may set the transmit power value of the active RF chains to '$2P_{TX}$' to increase the transmit power.

If it is determined at step S530 that the measurement value (M) is greater than the first threshold value ($M_{th1}$), the radio scheduler may compare the measurement value (M) corresponding to the measurement information with a predetermined second threshold value ($M_{th2}$) at step S550.

If it is determined at step S550 that the measurement value (M) is less than or equal to the second threshold value ($M_{th2}$), the radio scheduler regards the terminal corresponding to the measurement value (M) as an 'intermediate measurement value user' and set the DL/UL/OFF period ratio to a value (e.g., '2:1:2') at step S560 to control the use time of the active RF chains. At step S560, the radio scheduler may set the number of active RF chains to '2N' and the transmit power of the active RF chains to '$P_{TX}$'.

The radio scheduler may reduce the DL transmit period for the 'intermediate measurement value user' but to be longer than that for the 'weak measurement value user'.

If it is determined at step S550 that the measurement value (M) is greater than the second threshold value ($M_{th2}$), the radio scheduler may regards the terminal corresponding to the measurement value (M) as a 'strong measurement value user' and set the DL/UL/OFF period ratio for the multiple RF chains to a value (e.g., '3:1:1') to control the use time of the multiple RF chains. At step S570, the radio scheduler may set the number of active RF chains to 'N' and the transmit power of the active RF chains to '$P_{TX}$'.

The radio scheduler may reduce the DL transmit period for the 'strong measurement value user' but to be longer than that for the 'intermediate measurement value user' to reduce the use time of the multiple RF chains and may set the number of multiple RF chains to 'N' to reduce the number of active RF chains.

Although the status of the multiple RF chains are adjusted in a specific manner as described in the embodiment of FIG. 5, the present description is not limited thereto but may encompass other examples in which the status of the multiple RF chains are adjusted in various manners depending on the design of the device including the multiple RF chains.

Figure 6:
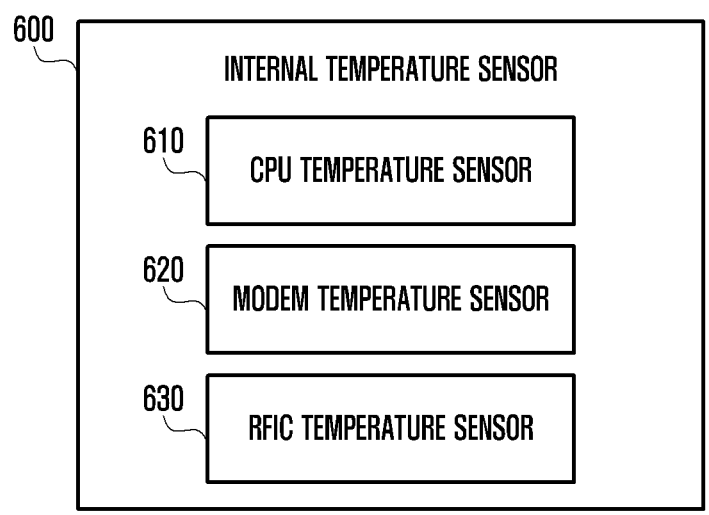
FIG. 6 is a diagram of a configuration of an internal temperature sensor, according to an embodiment.

FIG. 6 is a diagram of a configuration of an internal temperature sensor, according to an embodiment.

Referring to FIG. 6, the internal temperature sensor 600 may include a CPU temperature sensor 610, a modem temperature sensor 620, and an RF integrated circuits (RFIC) temperature sensor 630. The CPU, modem, and RFIC are installed inside the device equipped with multiple RF chains. The CPU denotes the central processing unit of the device, the modem performs conversion between analog and digital signals and modulation and demodulation thereon. The RFIC may include the multiple RF chains and an RF status configuration unit.

The internal temperature sensor 600 may determine a measured temperature value (T) based on a combination of multiple internal temperature measurement values (e.g., CPU temperature measurement value, modem temperature measurement value, and RFIC temperature measurement value) and provide the radio scheduler with the measured temperature value (T).

Figure 7:
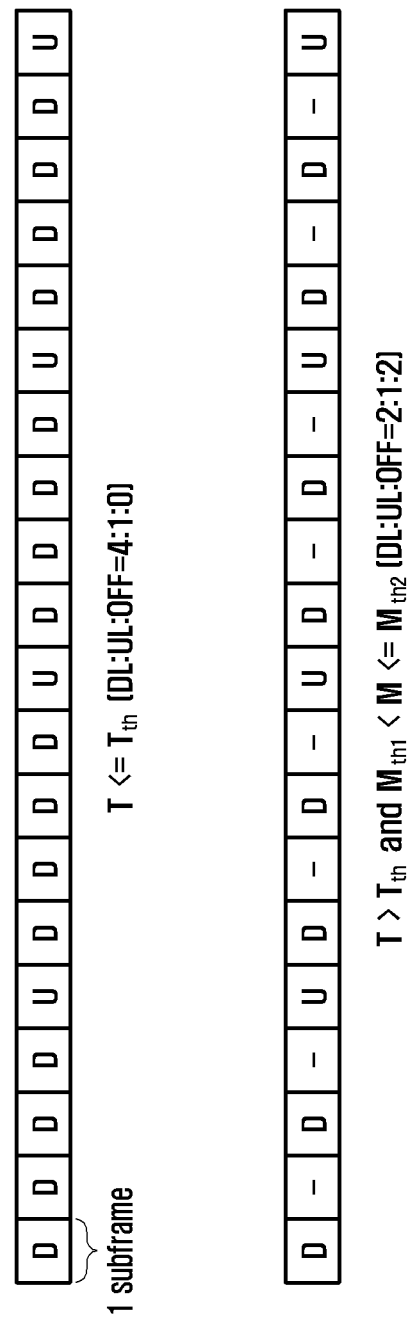
FIG. 7 is a diagram of a procedure for controlling a use time of RF chains for an intermediate measurement value user, according to an embodiment.

FIG. 7 is a diagram of a procedure for controlling a use time of RF chains for an intermediate measurement value user, according to an embodiment.

Referring to FIG. 7, the radio scheduler may set the DL/UL/OFF period ratio for the multiple RF chains to '4:1:0' under a normal temperature condition in which the measured temperature (T) is less than or equal to the temperature threshold ($T_{th}$).

If the device is under a high temperature conditions in which the measured temperature (T) is greater than the temperature threshold ($T_{th}$) and the user terminal is regarded as an intermediate measurement value user ($M_{th1}$<M≤$M_{th2}$), the radio scheduler set the DL/UL/OFF period ratio to '2:1:2' to reduce the use time of the multiple RF chains so as to be shorter than that in the situation where the device is under the normal temperature condition.

Figure 8A:
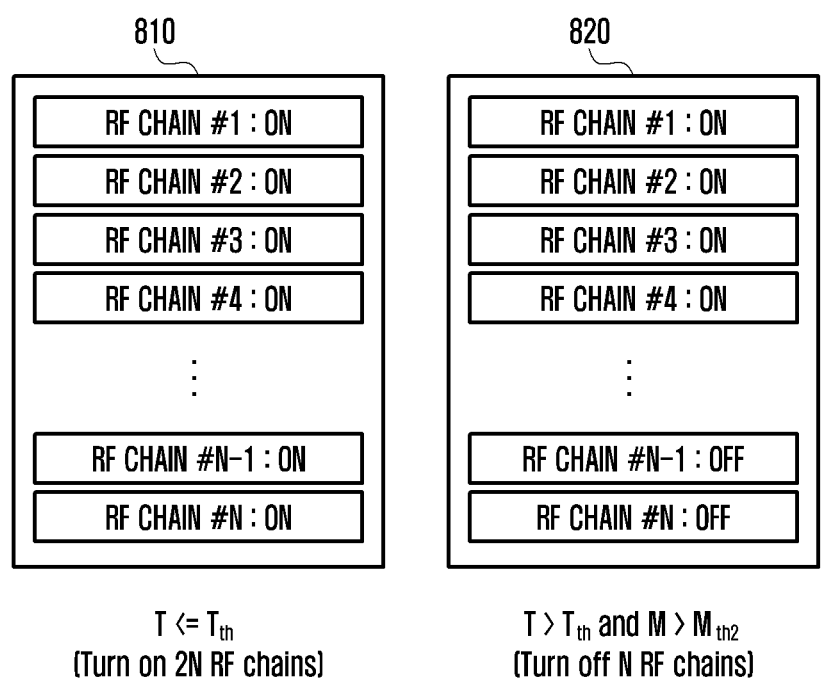
FIG. 8A is a diagram of a procedure for use of part of multiple RF chains for a strong measurement value user, according to an embodiment.

FIG. 8A is a diagram of a procedure for use of part of multiple RF chains for a strong measurement value user, according to an embodiment.

Referring to FIG. 8A, the radio scheduler may activate all of multiple RF chains (RF chains #1 to # N) (e.g., 2N RF chains, where N is a natural value greater than or equal to 1) under a normal temperature condition in which the measured temperature (T) is less than or equal to the temperature threshold ($T_{th}$).

The radio scheduler may activate half the 2N RF chains (i.e., N RF chains) under a high temperature condition in which the measured temperature (T) is greater than the temperature threshold ($T_{th}$) and the user terminal is regarded as a strong measurement value user (M>$M_{th2}$).

For a strong measurement value user, the radio scheduler may deactivate half the multiple RF chains to achieve a data rate higher than that achievable by transmitting the radio signal during the half period with all of the RF channels. It may also be possible for the scheduler to maintain a number of antenna ports to maintain a rank order for MIMO transmission although half of the RF chains are activated.

Figure 8B:
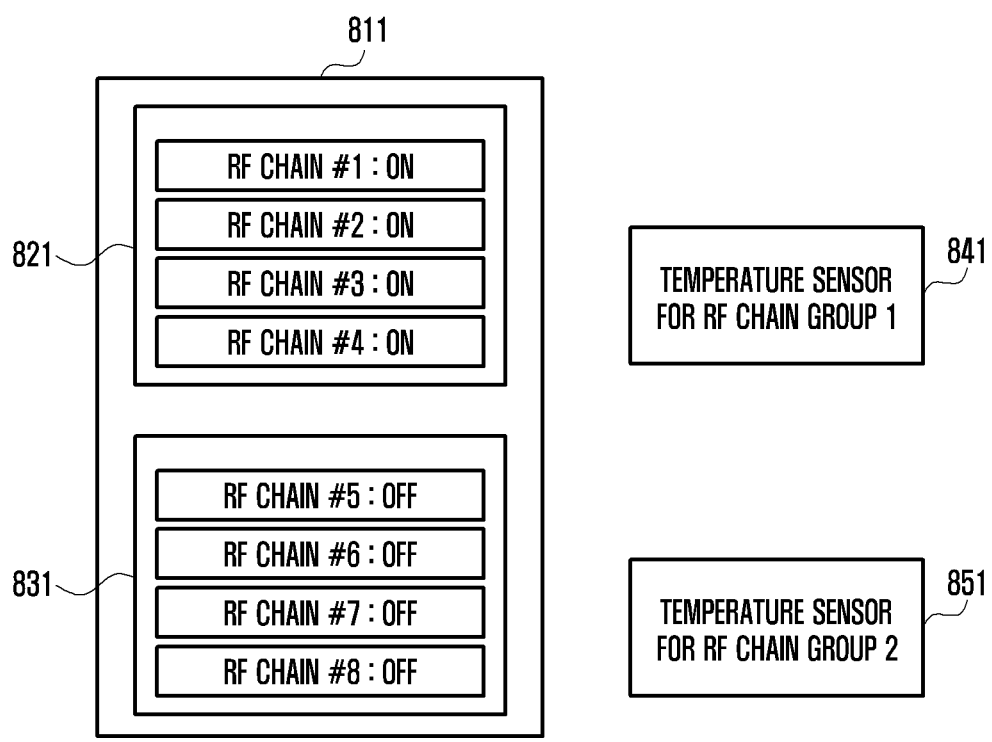
FIG. 8B is a diagram of a procedure for use of part of multiple RF chains for a strong measurement value user, according to an embodiment.

FIG. 8B is a diagram of a procedure for use of part of multiple RF chains for a strong measurement value user, according to an embodiment.

Referring to FIG. 8B, the multiple RF chains 811 may be divided into two RF chain groups 821 and 831, which have respective temperature sensors 841 and 851.

Although FIG. 8B depicts that the RF chains are divided into two groups for convenience of explanation, the present description is not limited to the embodiment of FIG. 8B and may encompass other examples in which multiple RF chains are divided into a certain number of groups depending on the design of the device.

If a second temperature value measured by the temperature sensor 851 for an RF chain group 2 is greater than a first temperature value measured by the temperature sensor 841 for an RF chain group 1, the radio scheduler may activate ("ON") the RF chain group 1 821 and deactivate ("OFF") the RF chain group 2 831. Afterward, if the first temperature value becomes greater than the second temperature value as time goes by, the radio scheduler may activate ("ON") the RF chain group 2 831 and deactivate ("OFF") the RF chain group 1 821.

Figure 9A:
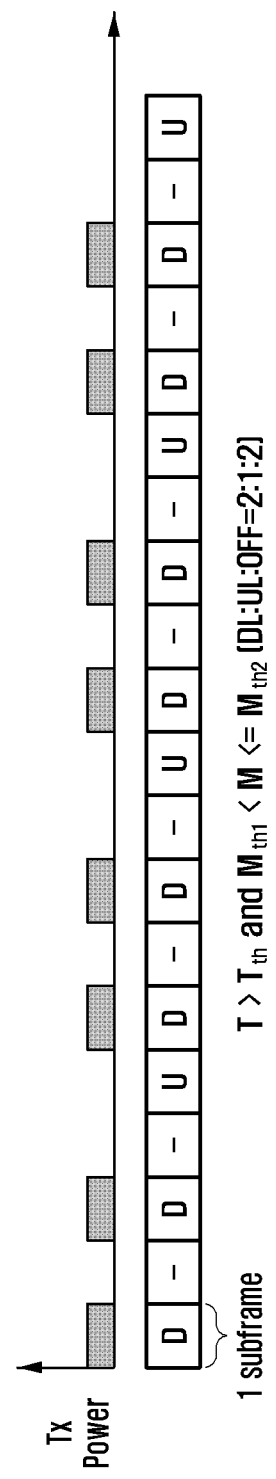
FIGS. 9A and 9B are diagrams of a procedure for controlling a user time and a transmit power of RF chains for an intermediate measurement value user and a weak measurement value user in a comparative manner, according to an embodiment.
Figure 9B:
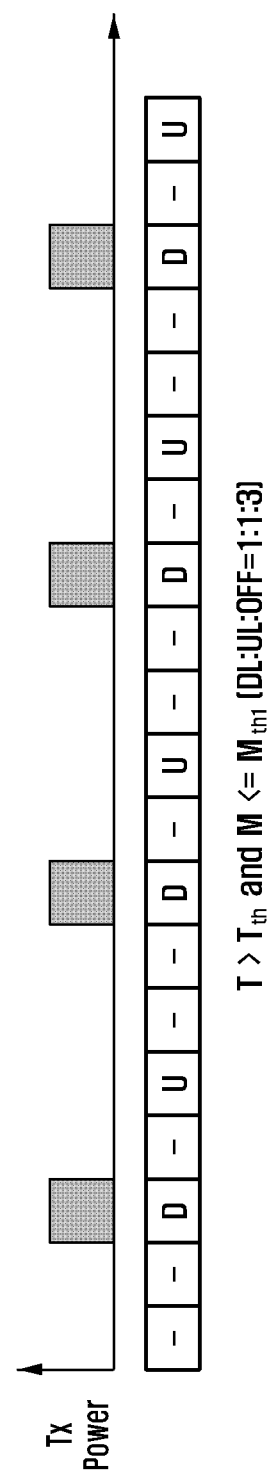

FIGS. 9A and 9B are diagrams of a procedure for controlling a user time and a transmit power of RF chains for an intermediate measurement value user and a weak measurement value user in a comparative manner, according to an embodiment.

FIG. 9A shows a procedure for controlling the use time and transmit power of the RF chains for an intermediate measurement value user, and FIG. 9B shows a procedure for controlling the use time and transmit power of the RF chains for a weak measurement value user.

Referring to FIGS. 9A and 9B, if the measurement value (M) is less than or equal to the first threshold value ($M_{th1}$), the radio scheduler may regard the terminal corresponding to the measurement value (M) as a 'weak measurement value user' and set the DL/UL/OFF period ratio to '1:1:3', thereby reducing the use time of the multiple RF chains in comparison with that for a 'intermediate measurement value user'. The radio scheduler may also set the transmit power of the multiple RF chains to '$2P_{TX}$' to increase the transmit power in comparison with that for the 'intermediate measurement value user'.

For a weak measurement value user, the radio scheduler may increase the transmit power of the RF chains by two and decrease the transmit time by half, thereby achieving higher data rate at the same transmit power in comparison with decreasing the transmit time by half.

Figure 10A:
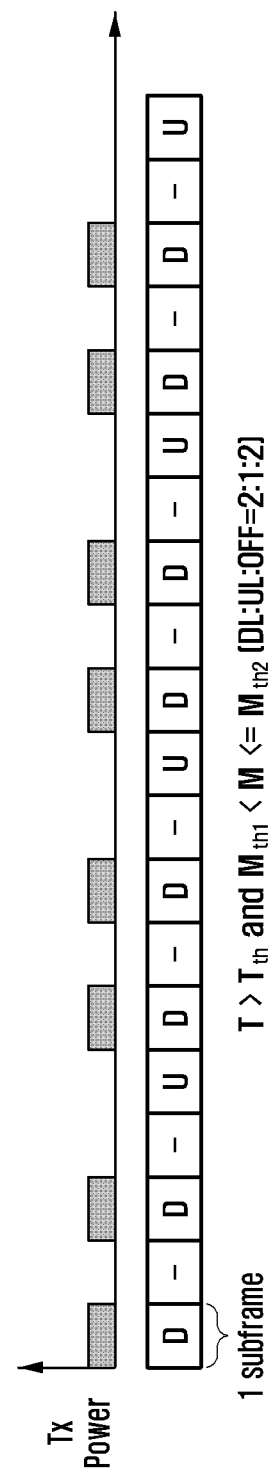
FIGS. 10A and 10B are diagrams of a procedure for controlling a user time and a transmit power of RF chains for an intermediate measurement value user and a weak measurement value user in a comparative manner, according to an embodiment.
Figure 10B:
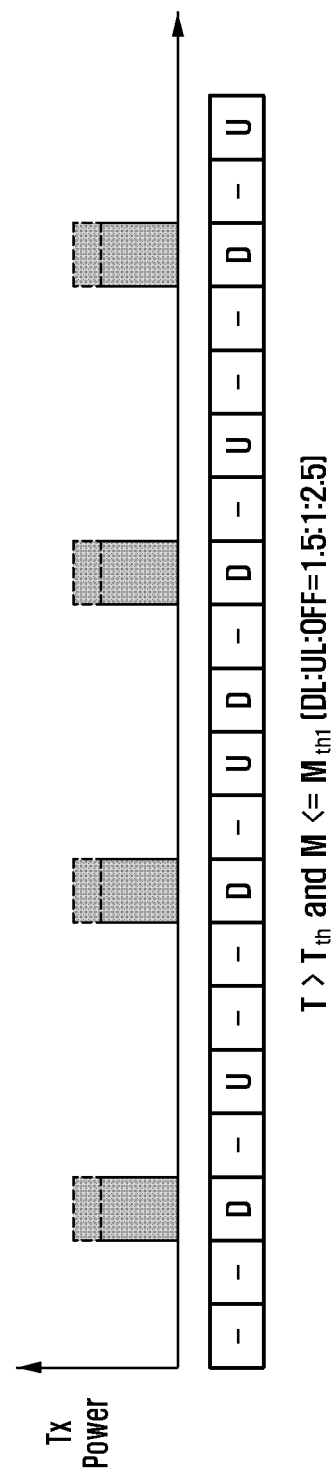

FIGS. 10A and 10B are diagrams of a procedure for controlling a user time and a transmit power of RF chains for an intermediate measurement value user and a weak measurement value user in a comparative manner, according to an embodiment.

FIG. 10A shows a procedure for controlling the user time and transmit power of the RF chains for an intermediate measurement value user, and FIG. 10B shows a procedure for controlling the user time and transmit power of the RF chains for a weak measurement value user.

Referring to FIGS. 10A and 10B, if the measurement value (M) is equal to or-less than the first threshold value ($M_{th1}$), the radio scheduler may regard the terminal corresponding to the measurement value (M) as a 'weak measurement value user' and set the DL/UL/OFF period ratio to '1.5:1:2.5', thereby reducing the use time of the multiple RF chains in comparison with that for a 'intermediate measurement value user'.

In comparison with the embodiment of FIG. 9B, the radio scheduler increases the data rate for the 'weak measurement value user' under the condition of maintaining the power consumption in the embodiment of FIG. 10B. The radio scheduler may increase the transmit power of the RF chains during the given DL period instead of decreasing the fraction of DL in the DL/UL/OFF period ratio.

Figure 11:
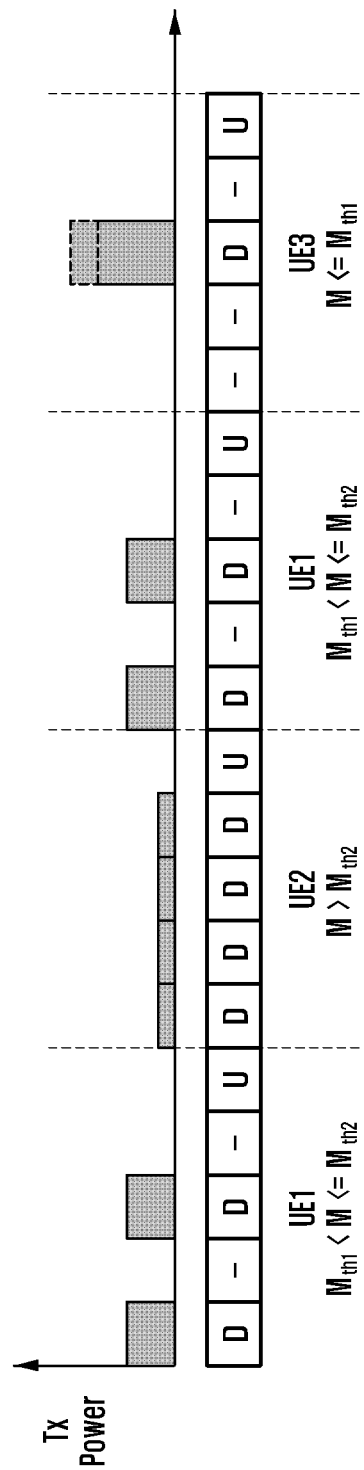
FIG. 11 is a diagram of a user-specific RF chains limitation method when multiple users are located within a cell, according to an embodiment.

FIG. 11 is a diagram of a user-specific RF chains limitation method for a case where multiple users are located within a cell, according to an embodiment.

If there are multiple users in the cell, the radio scheduler may determine a resource allocation priority order for the users according to expected per-user throughputs (e.g., proportional-pair scheduling). The throughput per user may be reflected in consideration of the throughputs achievable through different limitation schemes under a determined power consumption limit.

If only one user is allocated resources by the smallest unit of time period by which the user-specific limitation scheme is identified, the radio scheduler may reflect the maximum throughput achievable per limitation scheme in determining the scheduling priority order. As shown in FIG. 11, the smallest unit of time period available for identifying the user-specific limitation scheme may be 5 subframes. It may be optimal to select a limitation scheme that is capable of maximizing the throughput of the user with the allocated resources.

The radio scheduler may adjust the fraction of DL in the DL/UL/OFF period ratio for the multiple RF chains and the transmit power of the RF chains during the corresponding period so as to achieve maximum throughput per user terminal (UE1, UE2, and UE3).

If two or more users are allocated resources by the smallest unit of time period by which the user-specific limitation scheme is identified, the radio scheduler may reflect the sum of throughputs achievable with a combination of the users per the limitation scheme in determining the resource allocation priority order.

Figure 12:
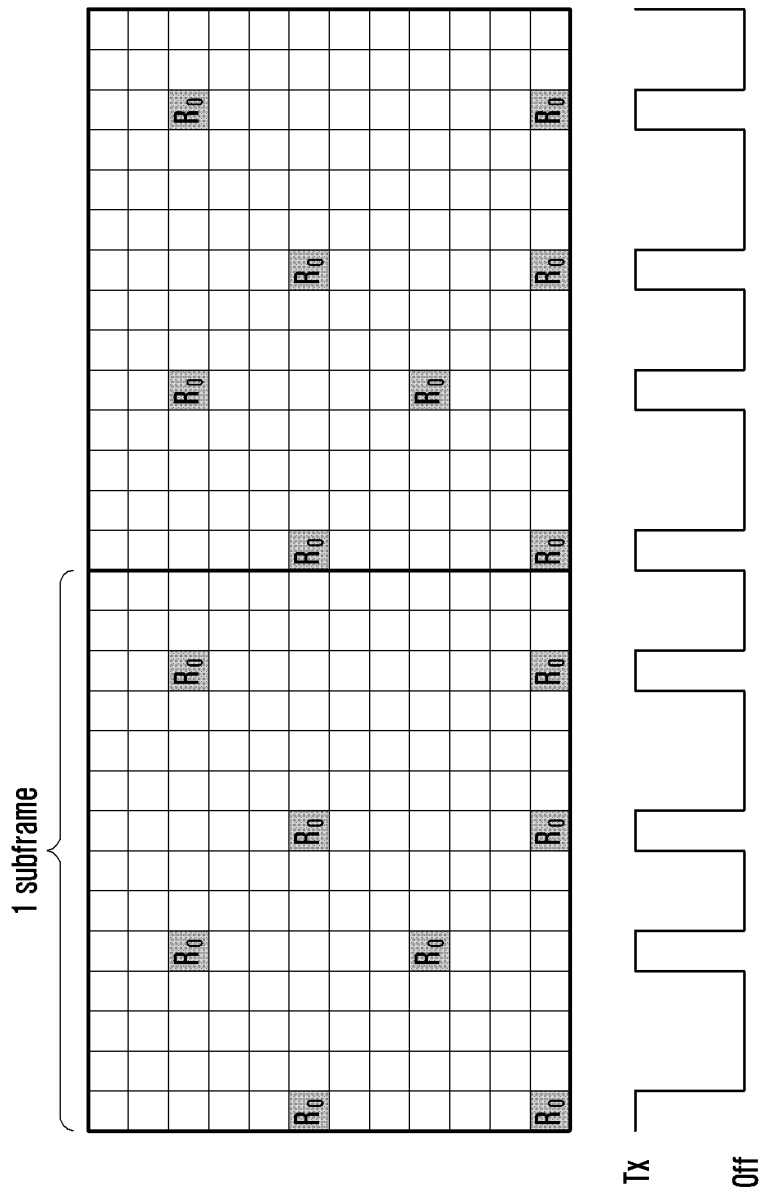
FIG. 12 is a diagram of a procedure for transmitting CRS, according to an embodiment.

FIG. 12 is a diagram of a procedure for transmitting CRS, according to an embodiment.

Referring to FIG. 12, since the radio scheduler has to schedule transmitting the CRS at predetermined subframes, it may be impossible to deactivate all of the RF chains. The radio scheduler may activate at least one of the multiple RF chains at the predetermined subframes carrying the CRS and deactivate all of the RF chains or adjust transmit powers of the RF chains in at the remaining subframes.

The radio scheduler may adjust the transmit powers of the RF chains or turn off the RF chains during the time period in which no cell-specific common control channel falls in the subframes carrying the cell-specific common control channel and user data together.

Figure 13:
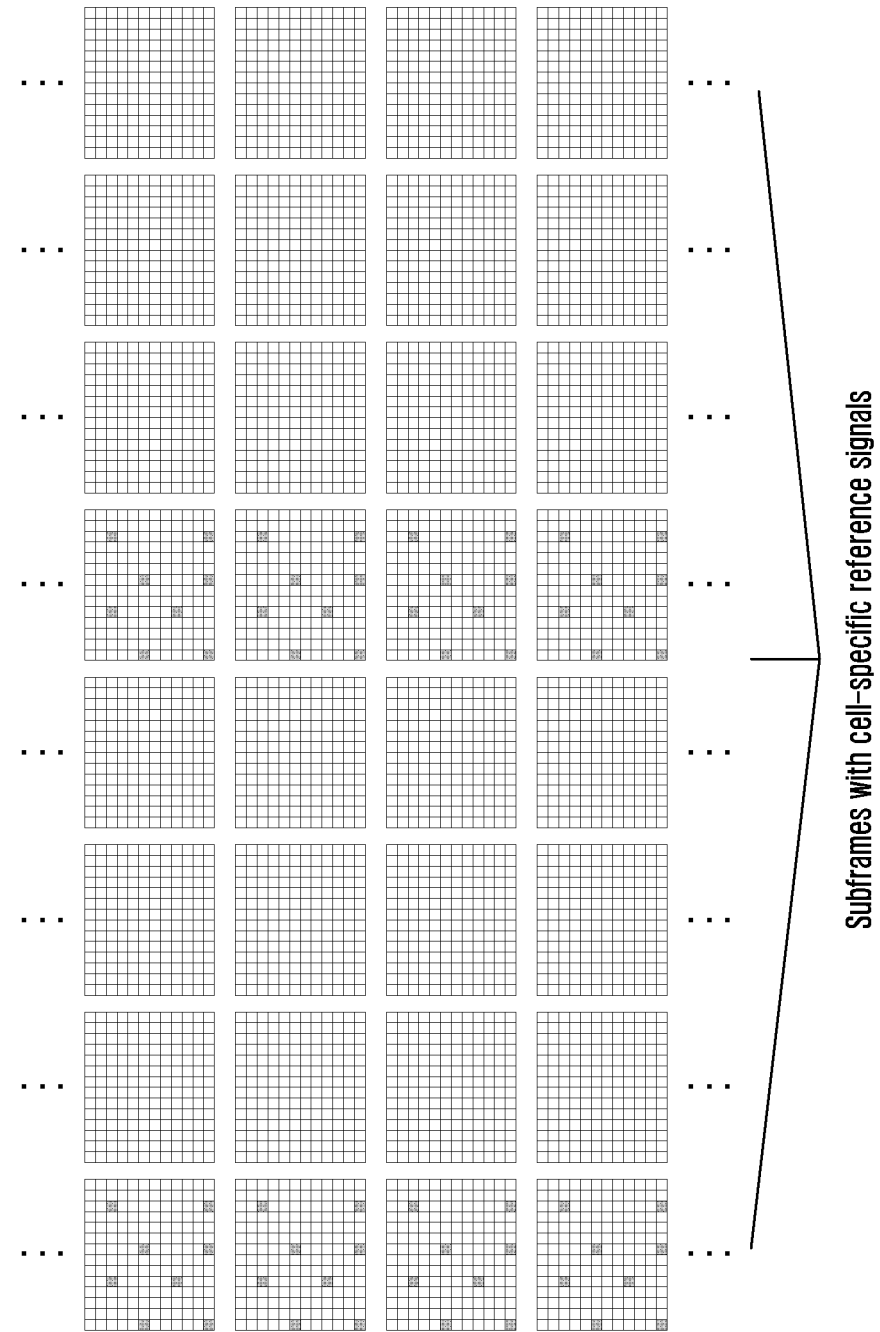
FIG. 13 is a diagram of resources to which a CRS is mapped, according to an embodiment.

FIG. 13 is a diagram of resources to which a CRS is mapped, according to an embodiment.

Referring to FIG. 13, a device (e.g., base station) equipped with a plurality of RF chains may broadcast an RRC signaling message to notify terminals of a discontinuous transmission period of a cell-specific common control channel. By notifying the user terminal whether the cell-specific common control channel is transmitted even in the case where the cell-specific common control channel and the user data are transmitted in different subframes, it is possible to increase the OFF period in which the RF chains are deactivated, the OFF period corresponding to the fraction of OFF in the DL/UL/OFF period ratio.

Figure 14:
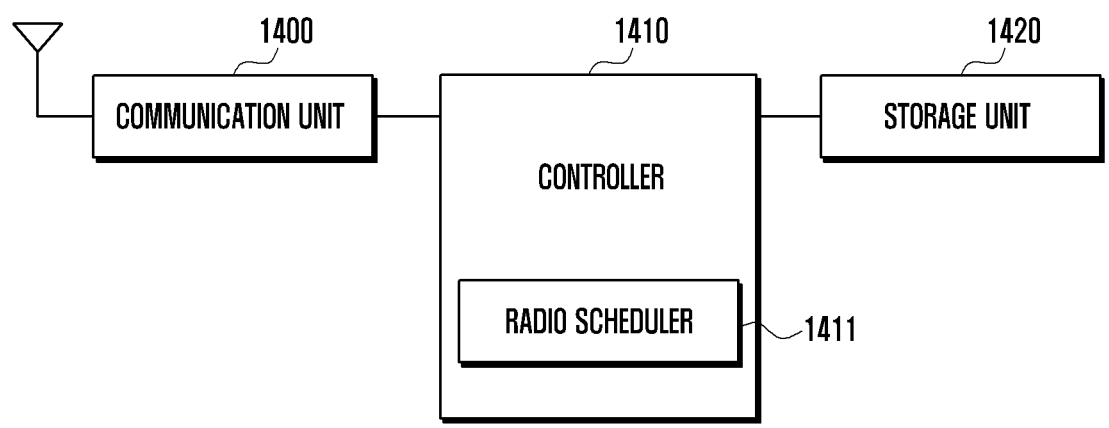
FIG. 14 is a diagram of a configuration of a device, according to an embodiment.

FIG. 14 is a diagram of a configuration of a device, according to an embodiment.

The device may be implemented as a base station of a TDD system. The device may also be implemented as a base station of an FDD system.

Referring to FIG. 14, the device equipped with a plurality of RF chains may include a communication unit 1400, a controller 1410, and a storage unit 1420.

The communication unit 1400 is responsible for transmitting and receiving radio signals carrying data. The communication unit 1400 may include a transmitter and a receiver or a transceiver. The communication unit 1400 may transmit and receive to and from a network entity, another base station, or a terminal. The communication unit 1400 may include an RF transmitter for up-converting and amplifying a signal to be transmitted and an RF receiver for low-noise-amplifying and down-converting a received signal.

The communication unit 1400 may also receive data over a radio channel, output the received data to the controller 1410, and transmits data output from the controller 1410 over the radio channel.

The controller 1410 may control signal flows among internal components of the device equipped with the multiple RF chains to realize the operations in the embodiments of the present disclosure. In detail, the controller 1410 may include a radio scheduler 1411, which may compare a measured temperature with a temperature threshold to control the status of at least one of the RF chains based on the comparison result and control the communication unit 1400 to transmit and receive radio signals via at least one antenna coupled to the at least one RF chain. It may be possible to measure the temperature by means of at least one sensor installed inside or outside of the device.

The radio scheduler 1411 may control the status of the multiple RF chains in such a way as to select at least one of the multiple RF chains for use in radio communication and adjust the use time or transit power of the at least one selected RF chain.

The radio scheduler 1411 may control to mute downlink transmission in at least one subframe configured for downlink transmission to adjust (i.e., reduce) the use time of the at least one RF chain and provide an upper layer with the measured temperature and per-user data rate information to receive data generated by the upper layer based on the measured temperature and the data rate.

The radio scheduler 1411 may control the communication unit 1400 to receive the measurement information measured and transmitted by a terminal that has received the radio signal and compare the measurement value corresponding to the measurement information with the first threshold value. The measurement information may be a CQI or a measurement report.

If the measured temperature is greater than the temperature threshold and if the measurement value is less than or equal to the first threshold value, the radio scheduler 1411 may decrease the use time of the at least one RF chain and increase the transmit power of the at least one RF chain.

If the measured temperature is greater than the radio scheduler 1411 and if the measurement value is greater than the first threshold value, the radio scheduler 1411 may compare the measurement value with a second threshold value.

If the measurement value is less than or equal to the second threshold value, the radio scheduler 1411 may decrease the use time of the at least one RF chain.

If the measurement value is greater than the second threshold value, the radio scheduler 1411 may decrease the number and the use time of the at least one RF chain.

The storage unit 1420 is responsible for storing programs and data necessary for the operation of the device and may include a program region and a data region.

Figure 15:
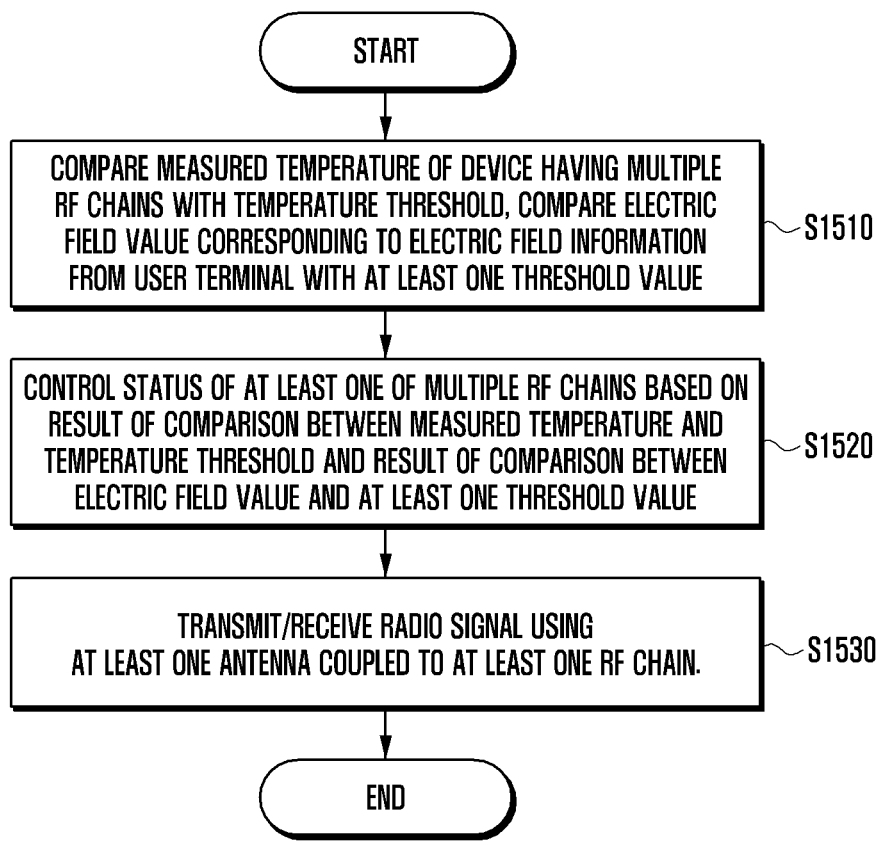
FIG. 15 is a flowchart of an operation method of a device, according to an embodiment.

FIG. 15 is a flowchart illustrating an operation method of a device according to an embodiment of the present disclosure.

In reference to FIG. 15, the device equipped with a plurality of RF chains may compare, at step S1510, the measured temperature with a temperature threshold and compare the measurement value corresponding to the measurement information received from a terminal user with at least one threshold value.

At step S1520, the device may control the status of at least one of the RF chain based on the result from the comparison between the measured temperature and the temperature threshold and the comparison between the measurement value and the at least one threshold value.

At step S1530, the device may transmit/receive a radio signal via at least one antenna coupled to the at least one RF chain.

As described above, the method and apparatus are advantageous in terms of reducing the size of a device equipped with multiple RF chains and mitigating performance degradation of the device in a high temperature in such a way of alleviating the heat radiation requirements in design.

Also, the method and apparatus are advantageous in terms of mitigating performance degradation of the device in such a way of configuring the device to perform a high temperature protection operation differently depending on the measurement information of the device.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for controlling a device having a plurality of radio frequency (RF) chains coupled to a plurality of antennas in a wireless communication system, the method comprising:
   identifying a subframe configuration below a temperature threshold, wherein the subframe configuration indicates a plurality of downlink (DL) subframes and a plurality of uplink (UL) subframes;
   comparing a measured temperature of the device with the temperature threshold;
   adjusting the subframe configuration based on a result of the comparing, wherein the adjusted subframe configuration further indicates at least one DL subframe in which an RF chain is turned off; and
   transmitting a radio signal using at least one of the antennas that is connected to the at least one RF chain based on the adjusted subframe configuration.

2. The method of claim 1, further comprising:
   selecting the at least one RF chain to use for radio communication among a plurality of RF chains; and
   increasing a transmit power of the selected at least one RF chain.

3. The method of claim 1, further comprising:
   receiving, before adjusting the subframe configuration measurement information by a receiving device that receives the radio signal; and
   comparing a measurement value corresponding to the measurement information with a first threshold value.

4. The method of claim 3, further comprising:
   if the measured temperature is higher than the temperature threshold and if the measurement value is less than or equal to the first threshold value, decreasing a use time of the at least one RF chain and increasing a transmit power of the at least one RF chain.

5. The method of claim 3, further comprising:
   if the measured temperature is higher than the temperature threshold and if the measurement value is greater than the first threshold value, comparing the measurement value with a second threshold value.

6. The method of claim 5, further comprising:
   if the measurement value is less than or equal to the second threshold value, decreasing a use time of the at least one RF chain.

7. The method of claim 5, further comprising:
   if the measurement value is greater than the second threshold value, decreasing a number of the at least one RF chain and a use time of the at least one RF chain.

8. The method of claim 2, wherein adjusting the use time of the at least one RF chain comprises:
   providing an upper layer with the measured temperature and per-user data rates for adjusting data amount in a downlink data buffer of the device and receiving data adjusted in an amount based on the measured temperature and the per-user data rate from the upper layer.

9. The method of claim 1, wherein the temperature is measured by at least one sensor installed inside or outside the device.

10. The method of claim 3, wherein the measurement information includes at least one of a channel quality indicator (CQI) and a measurement report.

11. A device equipped with a plurality of radio frequency (RF) chains coupled to a plurality of antennas, the device comprising:
    a transceiver configured to transmit and receive a signal; and
    a controller configured to:
    identify a subframe configuration below a temperature threshold, wherein the subframe configuration indicates a plurality of downlink (DL) subframes and a plurality of uplink (UL) subframes;
    control to compare a measured temperature of the device with the temperature threshold,
    adjusting the subframe configuration based on a result of the comparison, wherein the adjusted subframe configuration further indicates at least one DL subframe in which an RF chain is turned off, and
    transmit a radio signal using at least one of the antennas that is connected to the at least one RF chain based on the adjusted subframe configuration.

12. The device of claim 11, wherein the controller is further configured to:
    select the at least one RF chain to use for radio communication among a plurality of RF chains,
    increase a transmit power of the selected at least one RF chain.

13. The device of claim 11, wherein the controller is further configured to receive, before adjusting the subframe configuration, measurement information by a receiving device that receives the radio signal and compare a measurement value corresponding to the measurement information with a first threshold value.

14. The device of claim 13, wherein the controller is further configured to, if the measured temperature is higher than the temperature threshold and if the measurement value is less than or equal to the first threshold value, decrease a use time of the at least one RF chain and increasing a transmit power of the at least one RF chain.

15. The device of claim 13, wherein the controller is further configured to, if the measured temperature is higher than the temperature threshold and if the measurement value is greater than the first threshold value, compare the measurement value with a second threshold value.

16. The device of claim 15, wherein the controller is further configured to, if the measurement value is less than or equal to the second threshold value, decrease the use time of the at least one RF chain.

17. The device of claim 15, wherein the controller is further configured to, if the measurement value is higher than the second threshold value, decrease a number of the at least one RF chain and the use time of the at least one RF chain.

18. The device of claim 12, wherein the controller is further configured to provide an upper layer with the measured temperature and per-user data rates for adjusting data amount in a downlink data buffer of the device and receiving data adjusted in an amount based on the measured temperature and the per-user data rate from the upper layer.

19. The device of claim 11, wherein the temperature is measured by at least one sensor installed inside or outside the device.

20. The device of claim 13, wherein the measurement information includes at least one of a channel quality indicator (CQI) and a measurement report.

* * * * *